(12) United States Patent
Miette et al.

(10) Patent No.: US 10,875,711 B2
(45) Date of Patent: Dec. 29, 2020

(54) STORAGE-AND-RETRIEVAL CELL FOR A PARCEL-HANDLING LOGISTICS PLATFORM

(71) Applicant: Solystic, Bagneux (FR)

(72) Inventors: Emmanuel Miette, Saint Gratien (FR); Luc Chirol, Paris (FR)

(73) Assignee: SOLYSTIC, Bagneux (FR)

( * ) Notice: Subject to any disclaimer, the term of this patent is extended or adjusted under 35 U.S.C. 154(b) by 113 days.

(21) Appl. No.: 16/401,261

(22) Filed: May 2, 2019

(65) Prior Publication Data
US 2019/0337720 A1 Nov. 7, 2019

(30) Foreign Application Priority Data
May 4, 2018 (FR) ...................................... 18 53870

(51) Int. Cl.
*B65G 1/137* (2006.01)
*B65G 11/06* (2006.01)
*B65G 47/52* (2006.01)
*B65G 67/04* (2006.01)

(52) U.S. Cl.
CPC ............ *B65G 1/137* (2013.01); *B65G 11/063* (2013.01); *B65G 47/52* (2013.01); *B65G 67/04* (2013.01); *B65G 2201/0285* (2013.01)

(58) Field of Classification Search
CPC .. B07C 3/03; B65G 1/10; B65G 47/52; B65G 1/1378; B65G 1/137; G05D 2201/0216
USPC ....................................................... 700/215
See application file for complete search history.

(56) References Cited

U.S. PATENT DOCUMENTS

| | | | |
|---|---|---|---|
| 2008/0181753 A1* | 7/2008 | Bastian ................ | B65G 1/1375 414/277 |
| 2009/0074545 A1 | 3/2009 | Lert, Jr. et al. | |
| 2010/0300842 A1* | 12/2010 | Bastian, II ............ | B65G 1/026 198/586 |
| 2011/0054674 A1* | 3/2011 | Thorsson ............... | B65G 47/46 700/230 |
| 2015/0235165 A1* | 8/2015 | Miette .................. | G06Q 10/083 705/337 |
| 2017/0129705 A1* | 5/2017 | Luc ........................... | B07C 3/02 |
| 2020/0324321 A1* | 10/2020 | Chirol .................... | B65G 47/71 |

FOREIGN PATENT DOCUMENTS

EP    2 949 605 A1    12/2015
FR    2 996 788 A1    4/2014

* cited by examiner

*Primary Examiner* — Timothy R Waggoner
(74) *Attorney, Agent, or Firm* — Ware, Fressola, Maguire & Barber LLP

(57) ABSTRACT

The storage-and-retrieval cell for a parcel-handling logistics platform includes shuttle robots that position parcels in storage locations and that retrieve the parcels therefrom, which locations form two rows of storage locations that extend along a longitudinal direction, and four half-rows of storage locations that are disposed back-to-back in the longitudinal direction between the two rows, a hopper being open in the upper floor between one pair of half-rows and the other pair of half-rows, the hopper being designed to allow the parcels to pass through it while they are being retrieved, the cell further including nesting trolleys each of which is suitable for being hitched to a shuttle robot and which are suitable for nesting together in the same storage location, and, at the edge of the hopper, an unloading device for unloading a nesting trolley by sweeping its deck.

9 Claims, 3 Drawing Sheets

STORAGE-AND-RETRIEVAL CELL FOR A PARCEL-HANDLING LOGISTICS PLATFORM

CROSS REFERENCE TO RELATED APPLICATIONS

This application claims priority under 35 USC § 119 to French Patent Application No. 1853870 filed on May 4, 2018, which application is hereby incorporated by reference in its entirety.

TECHNICAL FIELD

The invention relates to a storage-and-retrieval cell for a parcel-handling logistics platform.

PRIOR ART

Logistics platforms are already known in which, for example, articles or parcels to be delivered to homes are brought in bulk by transport trucks to bays at which said articles or parcels are unloaded. The articles or parcels are then reorganized in such a manner as to be re-dispatched individually to their end destinations.

A logistics platform can use advantageously a plurality of storage levels and autonomous vehicles controlled by a centralized system for moving said articles or parcels around the premises.

Thus, Patent Application US 2009/0074545 discloses a warehouse in which autonomous vehicles move articles in such a manner as to serve storage locations situated along a network of travel paths extending over a plurality of vertical levels, and in which each level includes travel aisles between two rows of storage locations.

In that patent application, the articles to be moved may be transported from one vertical level to another by vertical conveyors, and the autonomous vehicles can transport the articles within each level, between storage locations and collection points situated away from the rows of storage locations.

SUMMARY OF THE INVENTION

Multi-level logistics platform architecture based on the use of shuttle robots for moving parcels within the same level can still be improved considerably so that more efficient use is made of said shuttle robots and so that the storage-and-retrieval operations are optimized.

To this end, the invention provides a storage-and-retrieval cell for a parcel-handling logistics platform for handling parcels with a view to delivering them, said storage-and-retrieval cell including an upper floor and autonomously movable shuttle robots that move incoming parcels so as to position them in storage locations under the remote control of a monitoring and control unit, said unit further being designed to control said shuttle robots in such a manner that they retrieve said parcels from the locations in sequence, in which storage-and-retrieval cell said storage locations are distributed over said upper floor in such a manner as to form, firstly, two rows of storage locations that face each other and that extend in mutually parallel manner along a longitudinal direction, and, secondly, four half-rows of storage locations that are disposed back-to-back and in pairs, the two pairs of half-rows extending in alignment with each other in said longitudinal direction between said two rows of storage locations, said rows and half-rows of locations defining travel aisles between them on said upper floor for the shuttle robots to travel during storing and retrieval of parcels, and in which storage-and-retrieval cell a vertical travel hopper for parcels is open in the upper floor between one pair of back-to-back half-rows and the other pair of back-to-back half-rows, said hopper being designed to allow said parcels to pass through it vertically while they are being unloaded in sequence into it using said shuttle robots under the control of said unit during retrieval, said storage-and-retrieval cell further including nesting trolleys each of which is suitable for being hitched to a shuttle robot and has a deck suitable for carrying a parcel, said nesting trolleys being of different heights and widths in such a manner as to be suitable for nesting together in the same storage location, and at the edge of said hopper, said storage-and-retrieval cell further including an automatic unloading device having at least one sweeper arm suitable for sweeping the deck of a nesting trolley carrying a parcel so as to cause said parcel to fall into the hopper under the effect of relative movement of the trolley and of the sweeper arm.

This arrangement of a cell with the hopper used as a collection point contributes to limiting the mean distance between the collection point and the storage locations, thereby reducing the mean distance travelled by the shuttle robots per parcel retrieved during the retrieval.

In particular, in this example, a hopper is a space reserved in an upper floor for allowing the parcels to travel vertically, in the form of an opening in said upper floor that is suitable for allowing the parcels to travel vertically, optionally by means of a vertical conveyor passing through the hopper.

As a result, both the efficiency in using the shuttle robots and also the speed of retrieving the articles or parcels are increased.

The storage cell of the invention may advantageously have the following features:
 it may include a plurality of upper floor levels, the hoppers of said upper floors being served by the same vertical conveyor;
 said vertical conveyor may be a helical conveyor; and
 said vertical conveyor may be a gravity conveyor.

Thus, a storage-and-retrieval cell of the invention may extend in height so as to increase its capacity without increasing its "footprint", i.e. without increasing the area it occupies on the floor.

In addition, such a cell does not need any infrastructure that is complex or that requires major maintenance for retrieving the parcels, thereby guaranteeing high availability and low operating cost.

The invention further provides a parcel-handling logistics center including at least one cell as defined above, and, on the ground floor, under said hopper, a parcel transporter that is suitable for transporting said parcels coming from said hopper in series towards a transport vehicle parked on the ground floor.

Such a platform makes advantageous use of the fact that the transport vehicles on the ground floor can be brought under a storage-and-retrieval cell, as close as possible to the hopper down which the retrieved parcels come, thereby reducing the need for parcel conveyor infrastructure, simplifying and minimizing the paths over which the parcels need to be conveyed, and increasing the speeds at which retrieval can take place from the cell, and at which the transport vehicle can be loaded.

In addition, by loading the transport vehicles with parcels under the storage-and-retrieval cell, the overall footprint of the platform is limited considerably.

The logistics platform of the invention may also have the following features:

it may include a plurality of adjacent cells with a common upper floor and a plurality of hoppers in the common upper floor, and, on the ground floor, under said hoppers, a plurality of parcel transporters suitable for serving a plurality of transport vehicles parked on the ground floor; and it may include a feed inlet via which parcels are fed and which is provided with identification means for identifying each parcel so as to provide postal delivery address information, and said monitoring and control unit may be arranged so that, on the basis of the address information of the parcels stored in the storage locations of a cell, said monitoring and control unit causes said shuttle robots to unload said parcels into the hopper of the cell in a certain postal delivery order in which the parcels are to be delivered that corresponds to a parcel loading order in which the parcels are loaded into the transport vehicle(s).

In this way, a logistics platform of the invention can not only make extremely efficient use of a limited ground floor area, but can also be extended very easily both horizontally and vertically so as to adapt its parcel-handling capacity.

Such a platform is particularly suitable for an urban or rural-urban fringe facility for delivering individual parcels to their final destinations, making it possible to procure increased automation of delivery round preparation, and easy and quick preparation of successive delivery waves.

BRIEF DESCRIPTION OF THE DRAWINGS

The present invention can be better understood and other advantages appear on reading the following detailed description of an embodiment given by way of non-limiting example and with reference to the accompanying drawings, in which.

DESCRIPTION OF AN EMBODIMENT

A particular embodiment of the invention consists of a parcel-handling logistics platform shown by FIGS. 1A to 3D, and having its architecture based on parcel storage-and-retrieval cells situated at mezzanine levels above a ground floor on which delivery vehicles such as trucks and vans travel.

Figure 1A:
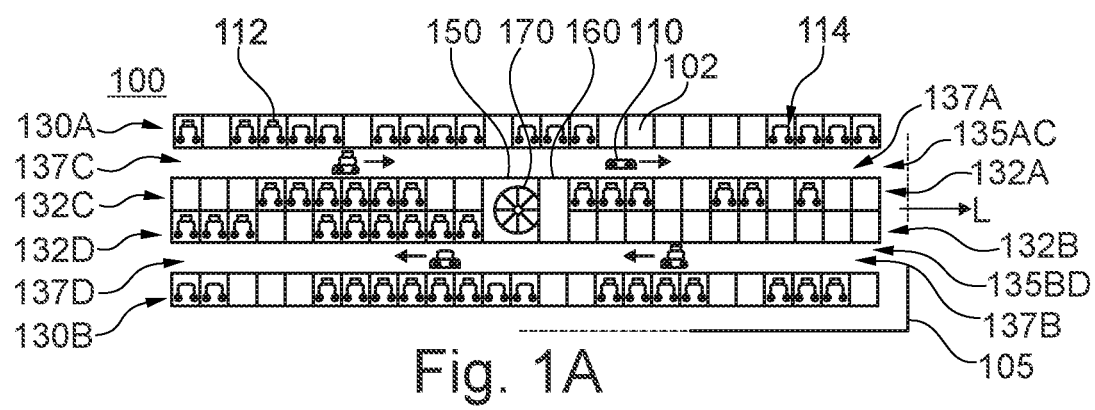
FIG. 1A is a plan view of a storage-and-retrieval cell of the invention.

FIG. 1A shows a storage-and-retrieval cell 100 of the invention with an upper floor 105 on which autonomously movable shuttle robots 110 move that are capable of moving incoming parcels 112 so as to position them in storage locations 102 under the remote control of a monitoring and control unit 120, by hitching up to nesting trolleys 114 carrying said parcels on decks 115 and by moving them in such a manner as to position them in the storage locations 102.

Said storage locations 102 are distributed over each upper floor 105 in such a manner as to form, firstly, two rows 130A and 130B of storage locations 102 that face each other and that extend in mutually parallel manner along a longitudinal direction (L), and, secondly, four half-rows 132A, 132B, 132C, and 132D of storage locations 102 that are disposed back-to-back and in pairs, the two pairs of half-rows extending in alignment with each other in the longitudinal direction L between the two rows 130A and 130B of storage locations, it being possible for the two half-rows to contain substantially the same number of parcels.

Thus, as shown by FIG. 1A, firstly the half-rows 132A and 132B are back-to-back and the half-rows 132C and 132D are also back-to-back, and secondly the half-rows 132A and 132C extend in alignment with each other and the half-rows 132B and 132D also extend in alignment with each other in the longitudinal direction L.

These rows and half-rows of locations define four half-aisles 137A, 137B, 137C, and 137D between them, each half-aisle being formed along the front of a respective one of the four half-rows 132A, 132B, 132C and 132D, the two half-aisles 137A and 137C formed in alignment with each other and the two half-rows 137B and 137D formed in alignment with each other respectively forming the aisles 135AC and 135BD.

In accordance with the invention, a hopper 150 is open in the upper floor between one pair of back-to-back half-rows 132A and 132B and the other pair of back-to-back half-rows 132C and 132D on the other side, said hopper 150 being designed to allow said parcels 112 to pass through it while they are being unloaded in sequence into it under the control of the monitoring and control unit 120 during a retrieval operation performed on the cell 100.

While retrieval is being performed from the cell, the shuttle robots go back and forth between the storage locations 102 and the hopper 150, which acts as a collection and transfer point, making it possible to transfer the parcels from the cell to a subsequent processing station situated at some other vertical level, e.g. a loading zone for loading the retrieved parcels into a delivery vehicle.

The hopper being placed centrally relative to the half-aisles of storage locations enables the distances over which the shuttle robots move to be minimized extremely efficiently.

Thus, for retrieval, each half-aisle may have a shuttle robot assigned to it that moves exclusively in said half-aisle, thereby making it possible to limit its mean movement per parcel brought from a storage position to the hopper, and to accelerate the retrieval performed on the cell, while also optimizing the use of said shuttle robot.

The cell of the invention is thus advantageous relative to a logistics platform architecture in which the shuttle robots have to bring each parcel to be retrieved to a collection point situated away from the travel aisles between the storage rows.

Figure 3A:
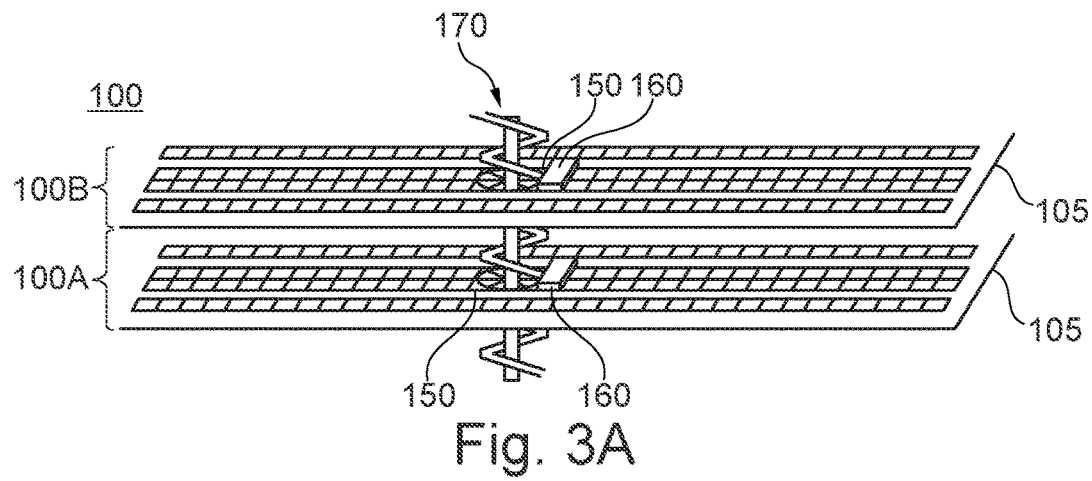
FIG. 3A is a perspective view of a cell of the invention that has at least two vertical levels.

As shown in FIG. 3A, the storage-and-retrieval cell of the invention may have a plurality of levels 100A and 100B, each having an upper floor level 105, each upper floor having a hopper 150, it being possible for the hoppers to coincide with one another vertically and to be served by a common vertical conveyor 170, e.g. a helical and/or gravity conveyor.

In the situation in which the hopper is used only to transfer parcels in a downward vertical direction, it is possible to use a gravity conveyor, thereby reducing the costs of installing and of operating the cell.

In this embodiment, the parcels 112 are moved in the cell by each of them being carried by a deck 115 of one of the nesting trolleys 114 moved by a shuttle robot to which it is hitched.

For example, the nesting trolleys may be as disclosed in Patent Application FR 2 996 788.

Figure 3B:
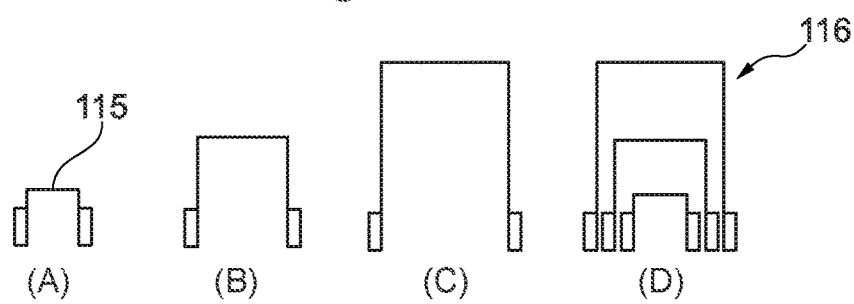
FIG. 3B shows nesting trolleys.

As shown by FIG. 3B, in which three configurations A, B, and C of nesting trolleys 114 are shown, the nesting trolleys 114 are of different heights and widths in such a manner as to nest together in the same storage location, as in the nested set 116 of nesting trolleys in configuration D of FIG. 3B, in which configuration three trolleys, each carrying a parcel, are nested together.

Figure 3C:
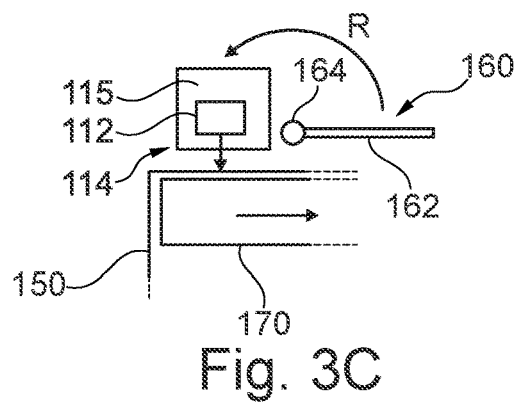
FIGS. 3C and 3D respectively show a plan view and a side view of a parcel-unloading device adapted to the nesting trolleys of FIG. 3B.
Figure 3D:
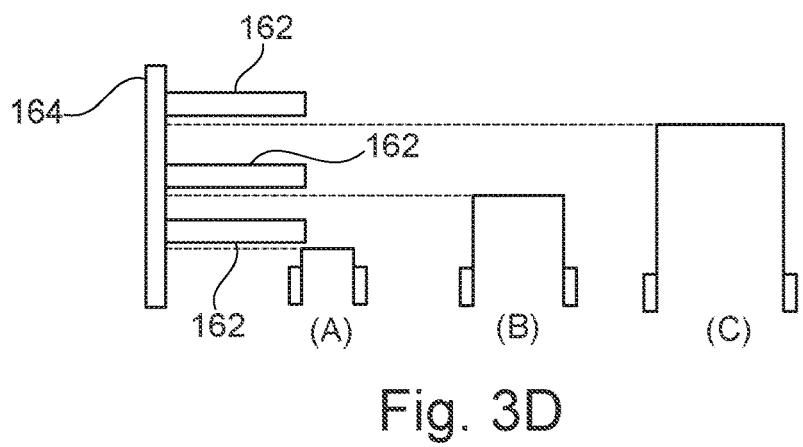

While retrieval is being performed on the cell, the nesting trolleys that are carrying parcels in a storage location are retrieved by the shuttle robots and then presented, in a particular sequence determined by the monitoring and control unit, to an automatic unloading device 160 that is situated at the edge of the hopper 150 and that causes the parcels to fall from the trolleys into said hopper, and onto the vertical conveyor 170, as shown in FIG. 3C.

More precisely, the unloading device 160 is arranged in such a manner as to sweep the decks of the trolleys so as to cause the parcels to fall into the hopper 150 under the effect of relative movement of the trolley 114 and of the sweeper arm, while taking into account the different deck heights of the nesting trolleys.

For example, such an unloading device 160 comprises three sweeper arms 162, each designed to sweep the deck 115 of a nesting trolley having a respective one of the three configurations A, B, and C by moving in rotation R about a support 164, as shown by the plan view of FIG. 3C, the unloading device being controlled by the monitoring and control unit in such a manner as to use the arm that is adapted to the trolley that is presented to it.

Figure 2A:
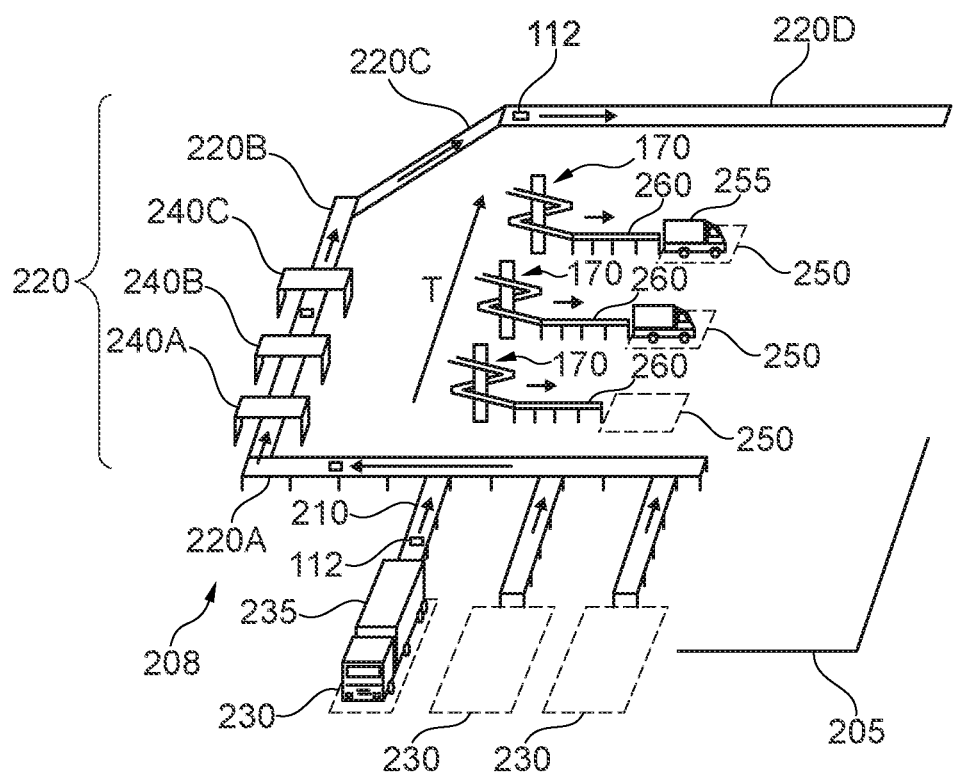
FIG. 2A is a fragmentary diagrammatic view of the logistics platform shown in FIG. 1B.
Figure 2B:
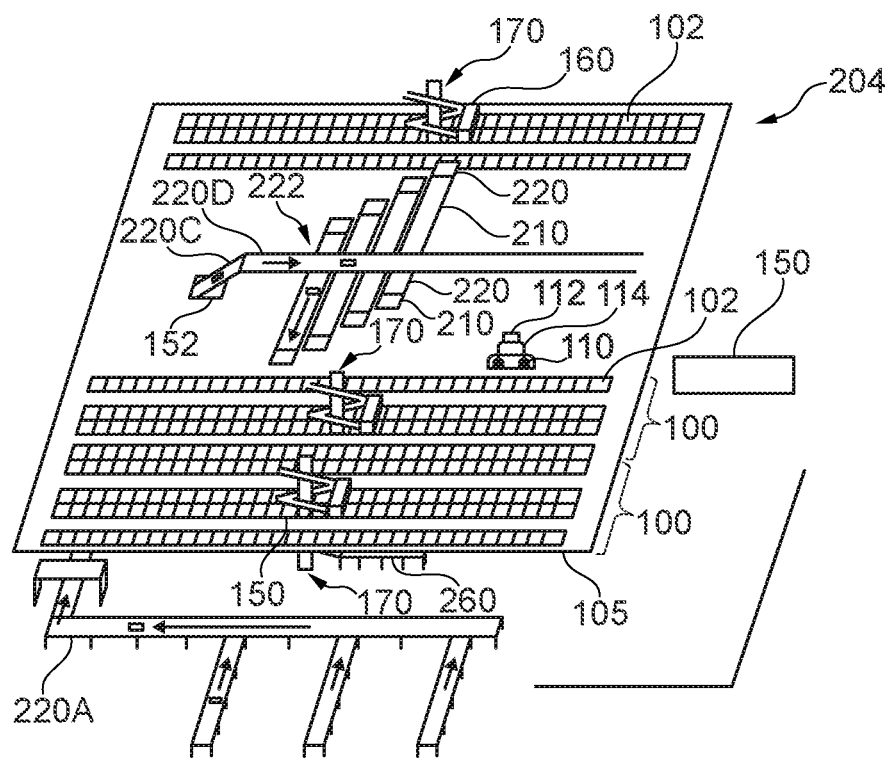
FIG. 2B is a fragmentary diagrammatic view of the platform shown in FIG. 2A with a mezzanine level comprising juxtaposed cells as shown by FIG. 1B.

FIGS. 2A and 2B are fragmentary views of a parcel-handling logistics platform 200 that incorporates a plurality of storage-and-retrieval cells 100 that are adjacent to one another and that share a common upper floor 105 that is raised relative to the level of the ground floor 205.

Such a logistics platform comprises at least one storage-and-retrieval cell 100, with, on the ground floor 205, under the hopper 150 of the cell, a parcel transporter 260 that is suitable for transporting the parcels coming from said hopper in series towards a transport vehicle 255 parked on the ground floor 205 in a parking place 250 adjacent to the low portion of the vertical conveyor serving the hopper of the cell. This transporter may be a horizontal conveyor that is a belt conveyor or a roller conveyer.

Figure 1B:
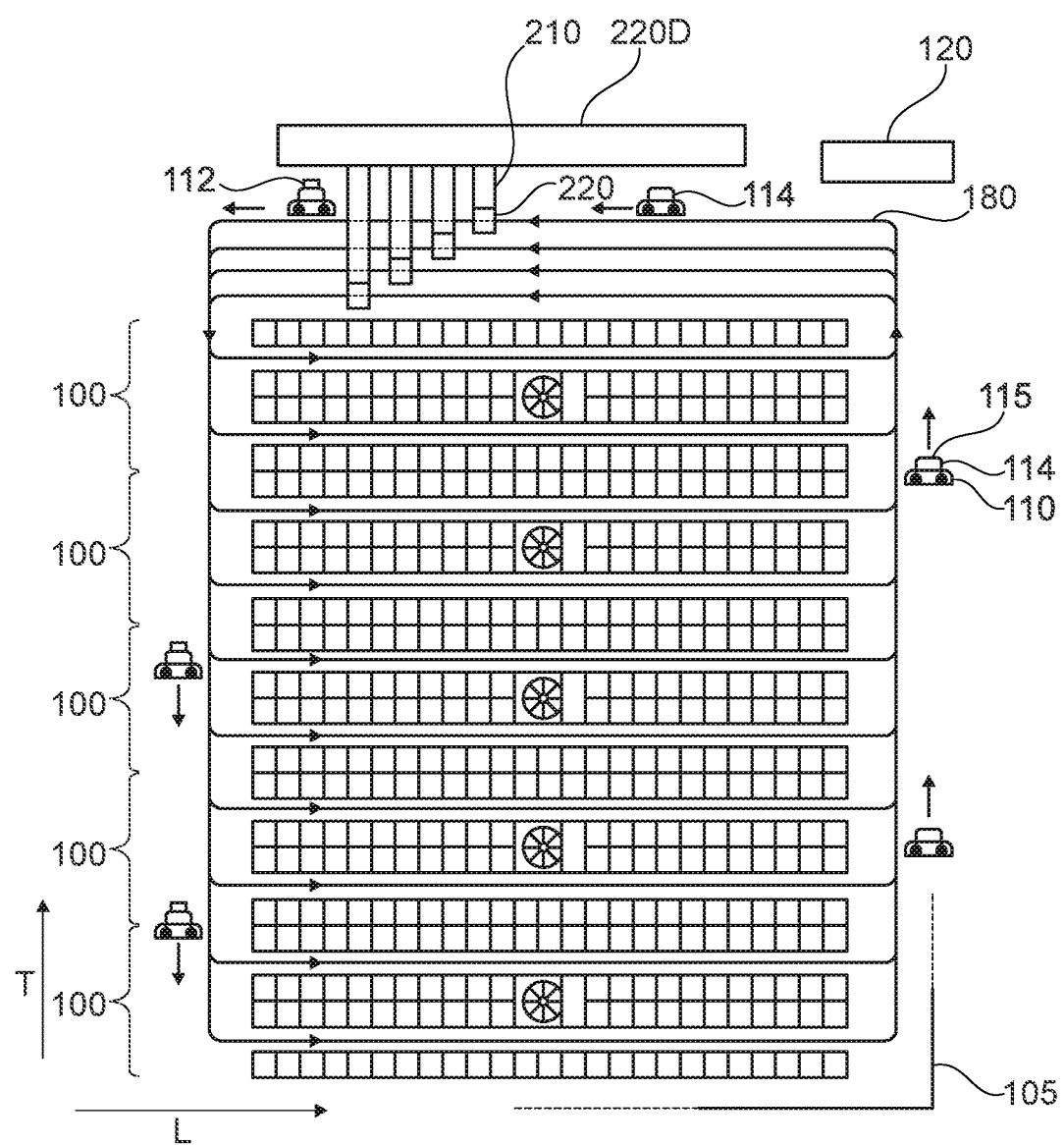
FIG. 1B shows operation of a logistics platform that, on one vertical level, comprises cells shown by FIG. 1A juxtaposed horizontally.

As shown by FIGS. 1B and 2A, when the platform comprises a plurality of adjacent cells, said cells are preferably oriented and juxtaposed in such a manner as to align their hoppers 150, their vertical conveyors 160, and their corresponding parking places 250 in a direction T that is transverse to the longitudinal direction L along which the cells extend, in order to rationalize the use of the space and in order to simplify maneuvering the transport vehicles 255.

In this example, said logistics platform has a feed inlet 208 constituted by unloading conveyors 210 for unloading trucks 235 in unloading parking places 230 situated on the ground floor 205, and by the conveyor system 220 arranged to convey the parcels 112 from the trucks 235 to a mezzanine upper level 204 having said storage-and-retrieval cells 100.

More precisely, for example, the conveyors 210 may be telescopic belt conveyors arranged in parallel to convey parcels from truck trailers 235 to the conveyor system 220 made up of conveyor sections 220A, 220B, 220C, and 220D successively transporting the parcels in that order.

The conveyor section 220A retrieves the incoming parcels unloaded onto the conveyors 210.

The conveyor section 220B causes the parcels to pass through a singulating system 240A for distributing them on the conveyor, a weighing and/or measuring system for weighing and/or measuring the dimensions of the parcels 240B and an identification system 240C for providing postal delivery address information about the parcels to the monitoring and control unit 120, which is arranged in such a manner as to manage handling of the parcels, e.g. in a manner analogous to the method described in Patent Application FR 2 996 788.

In response to such address information, the monitoring and control unit determines a storage location 102 appropriate for each parcel 112, in such a manner that parcels that are to be delivered in the same geographical zone and/or during the same delivery round are stored, for example, in the same storage-and-retrieval cell 100.

The conveyor section 220C causes the parcels to go up to the upper level 204, and it may be constituted by an inclined conveyor going through a hopper 152 in the upper floor 105 of the upper level 204.

A single conveyor section 220C is shown in this example, but an associated conveyor section 220C may correspond to each upper floor level 105 of a cell, the incoming parcels being steered towards the conveyor section 220C that corresponds to the storage locations determined by the monitoring and control unit 120.

The conveyor section 220D moves the parcels within the upper level 204 and is provided with a switch system 222 for switching the parcels towards parcel distribution conveyors 210 that distribute the parcels to loading stations 220 arranged in such a manner as to load the incoming parcels from the conveyors 210 to the nesting trolleys 114, under the control of the monitoring and control unit.

During a storing operation performed on the storage-and-retrieval cells, the shuttle robots move along a plurality of looped circuits 180 by following the travel aisles 135AC and 135BD of the cells in compliance with a one-way system, as indicated by the arrows, in such a manner as to present non-loaded nesting trolleys to the loading station 220 and as to place them, once loaded, in the storage locations 102.

The monitoring and control unit 120 is arranged so that, during a retrieval operation, the shuttle robots are controlled on the basis of postal delivery address information in such a manner as to unload the parcels 102 into the hoppers 150 in a certain postal delivery order that corresponds to a loading order in which the parcels are loaded into one or more transport vehicles 255, the parcels being conveyed vertically by the vertical conveyors 170 in such a manner as to bring the parcels back to the level of the ground floor where they are presented to said transport vehicles 255 via the transporters 260.

This handling is extremely efficient, since all of the parcels to be delivered in a given geographical zone are stored in the same cell and are retrieved via the same vertical conveyor so as to present them directly to a transport vehicle serving said geographical zone, e.g. in a sequence that is the reverse of the sequence of the delivery so as to facilitate loading the vehicle.

It is understood that the storage-and-retrieval cell of the invention may apply to articles other than postal parcels, such as baggage in an airport center.

In addition, the system 240C may be a reader for reading parcel identification codes, such as bar codes, and which, by association in a database, provides the address information on the basis of the recognition of the identification code of the parcel.

Naturally, the present invention is in no way limited to the above-described embodiment, which can undergo modifications without going beyond the ambit of the invention.

What is claimed is:

1. A storage-and-retrieval cell for a parcel-handling logistics platform for handling parcels with a view to delivering them, said storage-and-retrieval cell comprising:

an upper floor and autonomously movable shuttle robots that move incoming parcels so as to position them in storage locations under the remote control of a monitoring and control unit, said monitoring and control unit configured to control said shuttle robots in such a manner that they retrieve said parcels from the locations in sequence, in which storage-and-retrieval cell said storage locations are distributed over said upper floor in such a manner as to form, firstly, two rows of storage locations that face each other and that extend in mutually parallel manner along a longitudinal direction, and, secondly, four half-rows of storage locations that are disposed back-to-back and in pairs, the two pairs of half-rows extending in alignment with each other in said longitudinal direction between said two rows of storage locations, said rows and half-rows of locations defining travel aisles between them on said upper floor for the shuttle robots to travel during storing and retrieval of parcels, and in which storage-and-retrieval cell a vertical travel hopper for parcels is open in the upper floor between one pair of back-to-back half-rows and the other pair of back-to-back half rows, said hopper being configured to allow said parcels to pass through it vertically while they are being unloaded in sequence into the hopper using said shuttle robots under the control of said unit during retrieval, and nesting trolleys each of which is suitable for being hitched to a shuttle robot and has a deck suitable for carrying a parcel, said nesting trolleys being of different heights and widths in such a manner as to be suitable for nesting together in the same storage location, and in that, at the edge of said hopper, said storage-and-retrieval cell further includes an automatic unloading device having at least one sweeper arm suitable for sweeping the deck of a nesting trolley carrying a parcel so as to cause said parcel to fall into the hopper under the effect of relative movement of the trolley and of the sweeper arm.

2. The storage-and-retrieval cell according to claim 1, wherein it includes a plurality of upper floor levels, the hoppers of said upper floors being served by the same vertical conveyor.

3. The storage-and-retrieval cell according to claim 2, wherein said vertical conveyor is a helical conveyor.

4. The storage-and-retrieval cell according to claim 3, wherein said vertical conveyor is a gravity conveyor.

5. The storage-and-retrieval cell according to claim 2, wherein said vertical conveyor is a gravity conveyor.

6. A parcel-handling logistics platform, comprising:

at least one storage-and-retrieval cell according to claim 1, and, on the ground floor, under said hopper, a parcel transporter that is suitable for transporting said parcels coming from said hopper in series towards a transport vehicle parked on the ground floor.

7. The logistics platform according to claim 6, wherein it includes a plurality of adjacent cells with a common upper floor and a plurality of hoppers in the common upper floor, and, on the ground floor, under said hoppers, a plurality of parcel transporters suitable for serving a plurality of transport vehicles parked on the ground floor.

8. The logistics platform according to claim 7, wherein it includes a feed inlet via which parcels are fed and which is provided with identification means for identifying each parcel so as to provide postal delivery address information, and in that said monitoring and control unit is arranged so that, on the basis of the address information of the parcels stored in the storage locations of a cell, said monitoring and control unit causes said shuttle robots to unload said parcels into the hopper of the cell in a certain postal delivery order in which the parcels are to be delivered that corresponds to a parcel loading order in which the parcels are loaded into the transport vehicle(s).

9. The logistics platform according to claim 6, wherein it includes a feed inlet via which parcels are fed and which is provided with identification means for identifying each parcel so as to provide postal delivery address information, and in that said monitoring and control unit is arranged so that, on the basis of the address information of the parcels stored in the storage locations of a cell, said monitoring and control unit causes said shuttle robots to unload said parcels into the hopper of the cell in a certain postal delivery order in which the parcels are to be delivered that corresponds to a parcel loading order in which the parcels are loaded into the transport vehicle(s).

* * * * *